`US009098510B2`

(12) United States Patent
Seryakov et al.

(10) Patent No.: US 9,098,510 B2
(45) Date of Patent: Aug. 4, 2015

(54) METHODS AND SYSTEMS FOR IDENTIFYING AND ACCESSING MULTIMEDIA CONTENT

(75) Inventors: Vladyslav A. Seryakov, Reston, VA (US); Stuart A. White, Playa Vista, CA (US)

(73) Assignee: Arrabon Management Services, LLC, Santa Monica, CA (US)

( * ) Notice: Subject to any disclaimer, the term of this patent is extended or adjusted under 35 U.S.C. 154(b) by 173 days.

(21) Appl. No.: 13/554,660

(22) Filed: Jul. 20, 2012

(65) Prior Publication Data

US 2013/0188927 A1    Jul. 25, 2013

Related U.S. Application Data

(63) Continuation-in-part of application No. 13/357,279, filed on Jan. 24, 2012, now Pat. No. 8,996,543, and a continuation-in-part of application No. 13/357,303, filed on Jan. 24, 2012, now Pat. No. 9,026,544.

(51) Int. Cl.
*G06F 17/30* (2006.01)
*H04N 21/2543* (2011.01)
*H04N 21/258* (2011.01)
*H04N 21/45* (2011.01)
(Continued)

(52) U.S. Cl.
CPC ...... *G06F 17/30029* (2013.01); *H04N 21/2543* (2013.01); *H04N 21/25875* (2013.01); *H04N 21/4532* (2013.01); *H04N 21/4622* (2013.01); *H04N 21/4755* (2013.01); *H04N 21/47202* (2013.01); *G06F 17/30699* (2013.01); *G06F 17/30867* (2013.01); *H04N 21/4751* (2013.01); *H04N 21/4753* (2013.01)

(58) Field of Classification Search
CPC ................... G06F 17/30867; G06F 17/30699; G06F 17/30029
USPC ......................................................... 707/754
See application file for complete search history.

(56) References Cited

U.S. PATENT DOCUMENTS

| 4,520,404 A | 5/1985 | Von Kohorn |
| 4,605,964 A | 8/1986 | Chard |

(Continued)

OTHER PUBLICATIONS

U.S. Appl. No. 13/648,934 Notice of Allowance issued Oct. 7, 2014, 10 pages.

(Continued)

*Primary Examiner* — Joshua Bullock
(74) *Attorney, Agent, or Firm* — Lathrop & Gage LLP

(57) ABSTRACT

Methods, systems, and subsystems for identifying and accessing multimedia content are provided. One system is specifically provided for automatically selecting a content source for accessing a movie that is accessible from multiple content sources. Account log-in information for at least one of the content sources, cost preferences, and quality preferences are stored in computer memory. A processor is in data communication with the account log-in information and the stored cost and quality preferences. Programming causes the processor to automatically select between the content sources through which the movie is accessible; the automatic selection is restricted to: (a) content sources for which the account log-in information is stored, and (b) content sources for which no account log-in information is necessary. The automatic selection is based on a comparison of the stored cost and quality preferences to actual cost and quality information associated with the content sources.

10 Claims, 15 Drawing Sheets

(51) Int. Cl.
*H04N 21/462* (2011.01)
*H04N 21/472* (2011.01)
*H04N 21/475* (2011.01)

(56) References Cited

U.S. PATENT DOCUMENTS

| | | | |
|---|---|---|---|
| 5,598,276 | A | 1/1997 | Cookson |
| 5,664,046 | A | 9/1997 | Abecassis |
| 5,778,135 | A | 7/1998 | Ottesen et al. |
| 5,835,087 | A | 11/1998 | Herz et al. |
| 6,075,550 | A | 6/2000 | Lapierre |
| 6,133,912 | A | 10/2000 | Montero |
| 6,226,793 | B1 | 5/2001 | Kwoh |
| 6,269,216 | B1 | 7/2001 | Abecassis |
| 6,337,947 | B1 | 1/2002 | Porter |
| 6,351,596 | B1 | 2/2002 | Ostrover |
| 6,393,196 | B1 | 5/2002 | Yamane et al. |
| 6,430,357 | B1 | 8/2002 | Orr |
| 6,481,011 | B1 | 11/2002 | Lemmons |
| 6,519,770 | B2 | 2/2003 | Ford |
| 6,757,482 | B1 | 6/2004 | Ochial et al. |
| 6,771,875 | B1 | 8/2004 | Kunieda et al. |
| 6,813,438 | B1 | 11/2004 | Bates et al. |
| 6,867,818 | B2 | 3/2005 | Bray |
| 6,889,383 | B1 | 5/2005 | Jarman |
| 6,898,799 | B1 | 5/2005 | Jarman |
| 6,954,584 | B2 | 10/2005 | Kashiwagi |
| 6,972,802 | B2 | 12/2005 | Bray |
| 6,976,265 | B1 | 12/2005 | Yang |
| 7,139,031 | B1 | 11/2006 | Bray |
| 7,284,202 | B1 | 10/2007 | Zenith |
| 7,342,917 | B2 | 3/2008 | Mohan et al. |
| 7,360,234 | B2 | 4/2008 | Robson |
| 7,526,784 | B2 | 4/2009 | Jarman |
| 7,540,009 | B1 | 5/2009 | Bryant |
| 7,542,951 | B1 | 6/2009 | Chakrabarti et al. |
| 7,543,068 | B2 | 6/2009 | Aaron et al. |
| 7,543,318 | B2 | 6/2009 | Jarman |
| 7,577,970 | B2 | 8/2009 | Jarman |
| 7,584,159 | B1 | 9/2009 | Chakrabarti et al. |
| 7,634,790 | B2 | 12/2009 | Finseth et al. |
| 7,684,438 | B2 | 3/2010 | Stephens et al. |
| 7,774,288 | B2 | 8/2010 | Acharya et al. |
| 7,844,562 | B2 | 11/2010 | Gong et al. |
| 7,870,166 | B2 | 1/2011 | Lutnick |
| 7,877,395 | B2 | 1/2011 | Sarukkai et al. |
| 7,899,813 | B2 | 3/2011 | Song et al. |
| 7,979,426 | B2 | 7/2011 | Jeong et al. |
| 8,015,140 | B2 | 9/2011 | Kumar et al. |
| 8,019,707 | B2 | 9/2011 | Shani et al. |
| 8,037,003 | B2 | 10/2011 | Zhong et al. |
| 8,065,254 | B1 | 11/2011 | Deas et al. |
| 8,156,059 | B2 | 4/2012 | Dunning et al. |
| 8,170,971 | B1 | 5/2012 | Wilson et al. |
| 8,244,740 | B2 | 8/2012 | Gruenhagen et al. |
| 2001/0001159 | A1 | 5/2001 | Ford |
| 2001/0039657 | A1 | 11/2001 | Fopeano et al. |
| 2002/0106188 | A1 | 8/2002 | Crop |
| 2002/0147782 | A1 | 10/2002 | Dimitrova et al. |
| 2003/0014407 | A1 | 1/2003 | Blatter et al. |
| 2003/0049014 | A1 | 3/2003 | Siddiqui |
| 2003/0093790 | A1 | 5/2003 | Logan et al. |
| 2003/0122966 | A1 | 7/2003 | Markman et al. |
| 2003/0131352 | A1 | 7/2003 | Dutta et al. |
| 2003/0186645 | A1 | 10/2003 | Mori |
| 2003/0192044 | A1 | 10/2003 | Huntsman |
| 2004/0025180 | A1 | 2/2004 | Begeja et al. |
| 2004/0096188 | A1 | 5/2004 | Kageyama |
| 2005/0015795 | A1 | 1/2005 | Iggulden |
| 2005/0086255 | A1 | 4/2005 | Schran et al. |
| 2005/0086696 | A1 | 4/2005 | Daniels |
| 2005/0086705 | A1 | 4/2005 | Jarman |
| 2005/0132401 | A1 | 6/2005 | Boccon-Gibod et al. |
| 2005/0144641 | A1 | 6/2005 | Lewis |
| 2005/0204380 | A1 | 9/2005 | Lee |
| 2005/0210507 | A1 | 9/2005 | Hawkins et al. |
| 2006/0020973 | A1 | 1/2006 | Hannum et al. |
| 2006/0031870 | A1 | 2/2006 | Jarman et al. |
| 2006/0130119 | A1 | 6/2006 | Candelore |
| 2006/0179455 | A1 | 8/2006 | Jun et al. |
| 2006/0184983 | A1 | 8/2006 | Casey |
| 2006/0212415 | A1 | 9/2006 | Backer et al. |
| 2006/0212900 | A1 | 9/2006 | Ismail et al. |
| 2006/0215990 | A1 | 9/2006 | Proebstel |
| 2006/0282856 | A1 | 12/2006 | Errico et al. |
| 2007/0055980 | A1 | 3/2007 | Megeid |
| 2007/0098362 | A1 | 5/2007 | Sharma |
| 2007/0186235 | A1 | 8/2007 | Jarman |
| 2007/0204287 | A1 | 8/2007 | Conradt et al. |
| 2007/0204288 | A1 | 8/2007 | Candelore |
| 2007/0250863 | A1 | 10/2007 | Ferguson |
| 2007/0260603 | A1 | 11/2007 | Tuscano et al. |
| 2008/0040151 | A1 | 2/2008 | Moore |
| 2008/0147711 | A1 | 6/2008 | Spiegelman et al. |
| 2008/0307339 | A1 | 12/2008 | Boro et al. |
| 2009/0037355 | A1 | 2/2009 | Brave et al. |
| 2009/0049467 | A1 | 2/2009 | Robson |
| 2009/0089251 | A1 | 4/2009 | Johnston et al. |
| 2009/0150246 | A1 | 6/2009 | Meenakshi et al. |
| 2009/0177689 | A1 | 7/2009 | Song et al. |
| 2009/0222849 | A1 | 9/2009 | Peters |
| 2009/0231968 | A1 | 9/2009 | Ochi et al. |
| 2009/0271826 | A1 | 10/2009 | Lee et al. |
| 2009/0310932 | A1 | 12/2009 | Hseih |
| 2009/0313301 | A9 | 12/2009 | Reed et al. |
| 2010/0077428 | A1 | 3/2010 | Arnold et al. |
| 2010/0078829 | A1 | 4/2010 | Hargan |
| 2010/0094799 | A1 | 4/2010 | Ohashi et al. |
| 2010/0114665 | A1 | 5/2010 | Stengard et al. |
| 2010/0138517 | A1* | 6/2010 | De Los Reyes et al. ...... 709/218 |
| 2010/0223259 | A1 | 9/2010 | Mizrahi |
| 2010/0235535 | A1 | 9/2010 | Zhu |
| 2010/0262556 | A1* | 10/2010 | Shaya et al. .................. 705/347 |
| 2010/0287293 | A1 | 11/2010 | Wright et al. |
| 2011/0010307 | A1 | 1/2011 | Bates et al. |
| 2011/0072037 | A1 | 3/2011 | Lotzer |
| 2011/0087649 | A1 | 4/2011 | Sarukkai et al. |
| 2011/0225156 | A1* | 9/2011 | Pavlik .......................... 707/737 |
| 2011/0276993 | A1 | 11/2011 | Ferguson |
| 2012/0030159 | A1 | 2/2012 | Pilaszy et al. |

OTHER PUBLICATIONS

U.S. Appl. No. 13/357,279 Office Action issued Sep. 12, 2014, 6 pages.
U.S. Appl. No. 13/357,279 Response Office Action Filed Sep. 25, 2014, 7 pages.
Office Action in related U.S. Appl. No. 13/648,934 dated Feb. 7, 2014, 25 pages.
Office Action in related U.S. Appl. No. 13/357,279 dated Feb. 6, 2014, 15 pages.
Response to Office Action in related U.S. Appl. No. 13/357,279 dated Apr. 7, 2014, 10 pages.
Advisory Action in related U.S. Appl. No. 13/357,279 dated Apr. 25, 2014, 3 pages.
Office Action in related U.S. Appl. No. 13/357,303 dated Jan. 28, 2014, 24 pages.
Response to Office Action in related U.S. Appl. No. 13/357,303 dated Apr. 7, 2014, 13 pages.
Advisory Action in related U.S. Appl. No. 13/357,303 dated Apr. 24, 2014, 3 pages.
Office Action in related U.S. Appl. No. 13/648,934 dated May 31, 2013, 32 pages.
Office Action in related U.S. Appl. No. 13/357,279 dated May 30, 2013, 24 pages.
Office Action in related U.S. Appl. No. 13/357,303 dated Jun. 11, 2013, 28 pages.
U.S. Appl. No. 13/357,303 Office Action dated Oct. 24, 2014, 10 pages.

* cited by examiner

| Violence | Language | Sexual Content | Mature Themes |
|---|---|---|---|
| Select the level of violence you are comfortable allowing: | Select the level of offensive language you are comfortable allowing: | Select the level of sexual content you are comfortable allowing: | Select which of the following mature themes you are comfortable allowing: |
| No violence | No language | Kissing | ☒ Smoking |
| Mild fighting | Mild language | Implied sexual situations | ☒ Alcohol consumption |
| Moderate violence | Moderate language | Partial nudity | ☐ Drug use |
| Strong violence | Brief strong language | Sex scenes | ☒ Intense/scary situations |
| Intense blood & gore | Pervasive strong language | Nudity | ☐ Occult |
|  |  | Rape |  |
| ↗ 1295a | ↗ 1295b | ↗ 1295c | ↗ 1295d |

6000 

User's name: John Doe
Users age: 20
User's gender: male
User's address: 12345 street, CA 95050
User's number: User 1.
User's sources: Netflix 4007A, Hulu Plus 4007C, Direct TV 4007D, and Fastpasstv.
User is more concerned with quality or cost: Quality
What is the highest resolution supported by the output device 1220:1080P
What level of violence is user comfortable with: intense violence
What level of offensive language is user comfortable with: pervasive strong language
What level of sexual content is user comfortable with: sex scenes
What level of mature themes is user comfortable with: all themes
What is the user's preferred payment method: if greater than $5 charge Credit Card, No.: xxxx xxxx xxxx, otherwise charge PayPal account no.: xxxxxx

FIG. 12

6002

User's name: Jane Doe
Users age: 18
User's gender: female
User's address: 3456 street, CA 95050
User's number: User 2.
User's sources: Netflix 4007A, Hulu Plus 4007C, Direct TV 4007D, and YouTube 4007F.
User is more concerned with quality or cost: Cost
User wants content that costs less than $2
What is the highest resolution supported by the output device 1220:420p
What level of violence is user comfortable with: mild fighting
What level of offensive language is user comfortable with: none
What level of sexual content is user comfortable with: kissing
What level of mature themes is user comfortable with: smoking
What is the user's preferred payment method: Credit Card No.: xxxx xxxx xxxx

FIG. 13

METHODS AND SYSTEMS FOR IDENTIFYING AND ACCESSING MULTIMEDIA CONTENT

RELATED APPLICATIONS

This application is a continuation-in-part claiming priority to U.S. patent application Ser. No. 13/357,279 filed Jan. 24, 2012 now U.S. Pat. No. 8,996,543. This application is also a continuation-in-part claiming priority to U.S. patent application Ser. No. 13/357,303 filed Jan. 24, 2012 now U.S. Pat. No. 9,026,544. The disclosure of each is incorporated herein in its entirety by reference.

BACKGROUND

Although the production of multimedia content is expanding at ever increasing rates, much of that content is overlooked due to insufficiencies in identification and access. Shortcomings in identification and access can relate to various problems, ranging for example from finding the content to knowing the subject matter and appropriateness of the content. Knowing whether content is appropriate for various users may be of particular interest to families and those with particular moral preferences. Methods, systems, and subsystems set forth herein may improve the identification of, and/or access to, multimedia content.

SUMMARY

Methods, systems, and subsystems for identifying and accessing multimedia content are set forth herein. In one embodiment, a system for identifying multimedia content, automatically selecting a content source from multiple content sources, and displaying the multimedia content from the selected content source includes a server, a user library content file, a user local setting file, and a local device. The server has an encyclopedic database, and the encyclopedic database has an accumulation of subject matter data about the multimedia content. The user library content file has data distilled from the encyclopedic database. The user local settings file has personal profile settings relating to filtering content and at least some of the multiple content sources. The local device is in data communication with the server, the user library content file, and the user local settings file. Instructions are stored on computer-readable media, and the instructions (when executed by a processor) perform steps for allowing: (a) the user library content file to be searched based on the personal profile settings; (b) one of the content sources to be automatically selected based on the personal profile settings; and (c) user-selected multimedia content to be displayed from the automatically-selected content source.

In another embodiment, a system for automatically selecting a content source from multiple content sources and displaying multimedia content from the selected content source includes a user's account log-in information for at least two of the multiple content sources. The account log-in information is stored in non-transitory computer memory. Further, the user's cost and quality preferences are stored in non-transitory computer memory, and a processor is in data communication with the stored account log-in information and the stored cost and quality preferences. Programming causes the processor to automatically select between the content sources which have multimedia content selected by the user; the automatic selection is based on the stored cost and quality preferences, and the automatic selection is restricted to: (a) content sources for which the account log-in information is stored, and (b) content sources for which no account log-in information is necessary. Programming also causes the user-selected multimedia content to be displayed from the automatically-selected content source.

In still another embodiment, a system is provided for automatically selecting a content source for accessing a movie that is accessible from multiple content sources. The system includes non-transitory computer memory storing account log-in information for at least one of the content sources, and the non-transitory computer memory or additional non-transitory computer memory stores cost and quality preferences. A processor is in data communication with the account log-in information and the stored cost and quality preferences. Programming causes the processor to automatically select between the content sources through which the movie is accessible; the automatic selection is restricted to: (a) content sources for which the account log-in information is stored, and (b) content sources for which no account log-in information is necessary. The automatic selection is based on a comparison of the stored cost and quality preferences to actual cost and quality information associated with the content sources.

In yet another embodiment, a system for automatically selecting a content source from multiple content sources and displaying the multimedia content from the selected content source is provided. The system includes at least one non-transitory computer memory and at least one processor in data communication with the at least one computer memory, an input device, and an output device. Programming causes the at least one computer memory to store a first user profile and a second user profile. The first user profile includes: (a) personal settings relating to filtering content based on data for a first user received through the input device; and (b) a selected hierarchy of content source attributes based on data for the first user received through the input device. The second user profile includes: (a) personal settings relating to filtering content based on data for a second user received through the input device; and (b) a selected hierarchy of content source attributes based on data for the second user received through the input device. Programming allows the first user to select multimedia content from a plurality of multimedia content meeting the personal settings relating to filtering content of the first user profile, and programming causes the at least one processor to automatically select a content source for the multimedia content selected by the first user (with the content source being one of a plurality of content sources through which the multimedia content is accessible). The automatically selecting is at least partially executed by the at least one processor comparing the selected hierarchy of content source attributes of the first user profile to actual content source attributes associated with the plurality of content sources. Programming causing the at least one processor to actuate the output device and thereby display the multimedia content selected by the first user from the automatically-selected content source for that multimedia content. Programming allows the second user to select multimedia content from a plurality of multimedia content meeting the personal settings relating to filtering content of the second user profile, and programming causes the at least one processor to automatically select a content source for the multimedia content selected by the second user (with the content source being one of a plurality of content sources through which the multimedia content is accessible). The automatically selecting is at least partially executed by the at least one processor comparing the selected hierarchy of content source attributes of the second user profile to actual content source attributes associated with the plurality of content sources. Programming causes the at least one processor to actuate the output device and thereby display the multimedia content selected by the second user from the automatically-selected content source for that multimedia content.

In still yet another embodiment, a system for automatically selecting a content source from multiple content sources and displaying the multimedia content from the selected content source includes at least one non-transitory computer memory and at least one processor in data communication with the at least one computer memory, an input device, and an output device. Instructions are stored in the at least one computer memory, and the instructions (when executed by the at least one processor) perform steps for storing a first user profile in the at least one computer memory. The first user profile includes: personal settings relating to filtering content based on data for a first user received through the input device; personal settings relating to name, address, and payment information based on data for the first user received through the input device; and a selected hierarchy of content source attributes based on data for the first user received through the input device. The instructions further perform steps for: automatically (upon selection by the first user) accessing and completing an account registration of a third party content source using the personal settings; allowing the first user to select multimedia content from a plurality of multimedia content meeting the personal settings relating to filtering content of the first user profile; automatically selecting a content source for the multimedia content selected by the first user, the content source being one of a plurality of content sources through which the multimedia content is accessible; and actuating the output device and thereby displaying the multimedia content selected by the first user from the automatically-selected content source for that multimedia content. The automatically selecting is at least partially executed by the at least one processor comparing the selected hierarchy of content source attributes of the first user profile to actual content source attributes associated with the plurality of content sources.

BRIEF DESCRIPTION OF THE DRAWINGS

FIG. 6 shows an exemplary screen shot illustrating various preferences in the system of FIG. 2.

FIG. 12 shows an exemplary profile of a user of the system of FIG. 9.

FIG. 13 shows an exemplary profile of another user of the system of FIG. 9.

DETAILED DESCRIPTION

Figure 1:
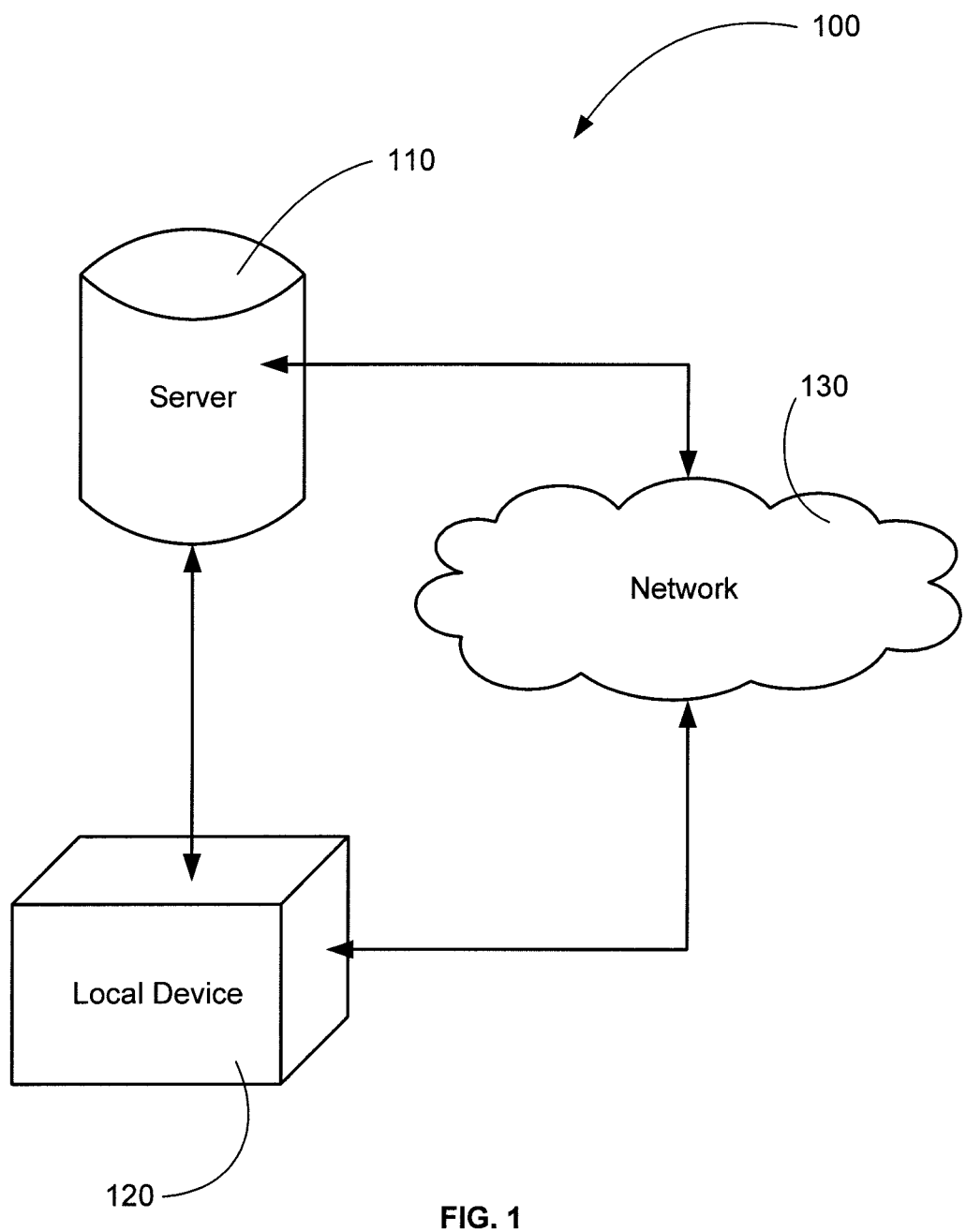
FIG. 1 shows a schematic overview of a system according to the current invention.

FIG. 1 shows a schematic overview of a system 100 for identifying and accessing multimedia content according to the current invention. In broad terms, the system 100 includes a server 110, a local device 120, and a network 130.

FIGS. 2 through 6 show one embodiment 1000 of the inventive system 100. With specific reference to FIG. 2, the system 1000 includes a server 1100, a local device 1200, and a network 1300 (e.g., the Internet, a wide area network, et cetera) having content 1310 and content data 1320 (i.e., information relating to the substance of the content 1310).

The server 1100 includes a processor 1105 in data communication with a communication device 1110, an input device 1115, an output device 1120, and computer memory 1125. While this document shall often refer to elements in the singular, those skilled in the art will appreciate that multiple such elements may often be employed and that the use of multiple such elements is fully contemplated herein. For example, multiple processors may be used as the processor 1105 instead of a single processor.

The communication device 1110 may be a modem or any other appropriate device, whether now existing or later developed, for allowing the processor 1105 to communicate with the local device 1200 and the network 1300. In some embodiments, the communication device 1110 may be a single device for communicating with the local device 1200 and the network 1300, while in other embodiments multiple devices may be used.

The input device 1115 and the output device 1120 may be any appropriate devices, whether now existing or later developed, for providing data to and presenting data from the processor 1105. For example, the input device 1115 may include a computer mouse, a touchpad, and/or a keyboard; and the output device 1120 may include a display screen, a printer, and/or an audible alarm. In some embodiments, the input device 1115 and the output device 1120 may be combined, such as through a touch screen.

The computer memory 1125 may include volatile and non-volatile memory, and any appropriate data storage devices whether now existing or later developed may be used. The computer memory 1125 may store an encyclopedic database 1150, a user library content file 1160, a user software file 1170, and a server software file 1180. Again, the database and files 1150, 1160, 1170, 1180 may include multiple databases and files, as will be appreciated by those skilled in the art, and the use of the singular herein encompasses such multiple databases and files.

The encyclopedic database 1150 includes an extensive accumulation of data about the substance of the content 1310. For example, the encyclopedic database 1150 may include information about actors, directors, writers, scripts, key words, titles, story lines, genres, soundtracks, release dates, box office data, ratings, presence of adult content (e.g., language, drug use, nudity, et cetera), reviews, awards, historical context, and other data associated with the content 1310. The database 1150 may be built and maintained (i.e., supplemented/updated) in one or more of various ways. For example, the server software file 1180 may cause the processor 1105 (via the communication device 1110) to automatically access and store the content data 1320 from the network 1300 using web crawler software instructions. Or the content data 1320 in the network 1300 may be accessed and stored in a non-automated manner (i.e., with human input). Or data may be obtained from reviewing the content 1310 and then input into the encyclopedic database 1150 in an automated or non-automated manner; for example, closed captioning data may be input into the encyclopedic database 1150.

Figure 4A:
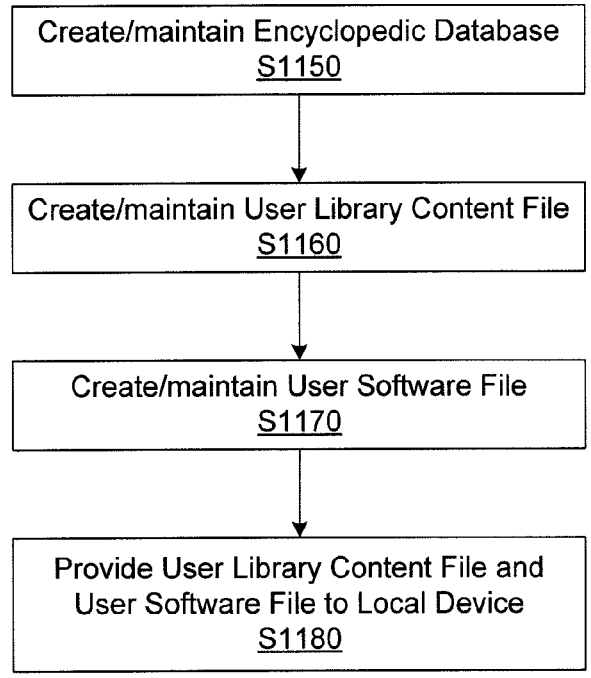
FIG. 4a shows high level steps associated with the server of the system of FIG. 2 when in use.
Figure 5A:
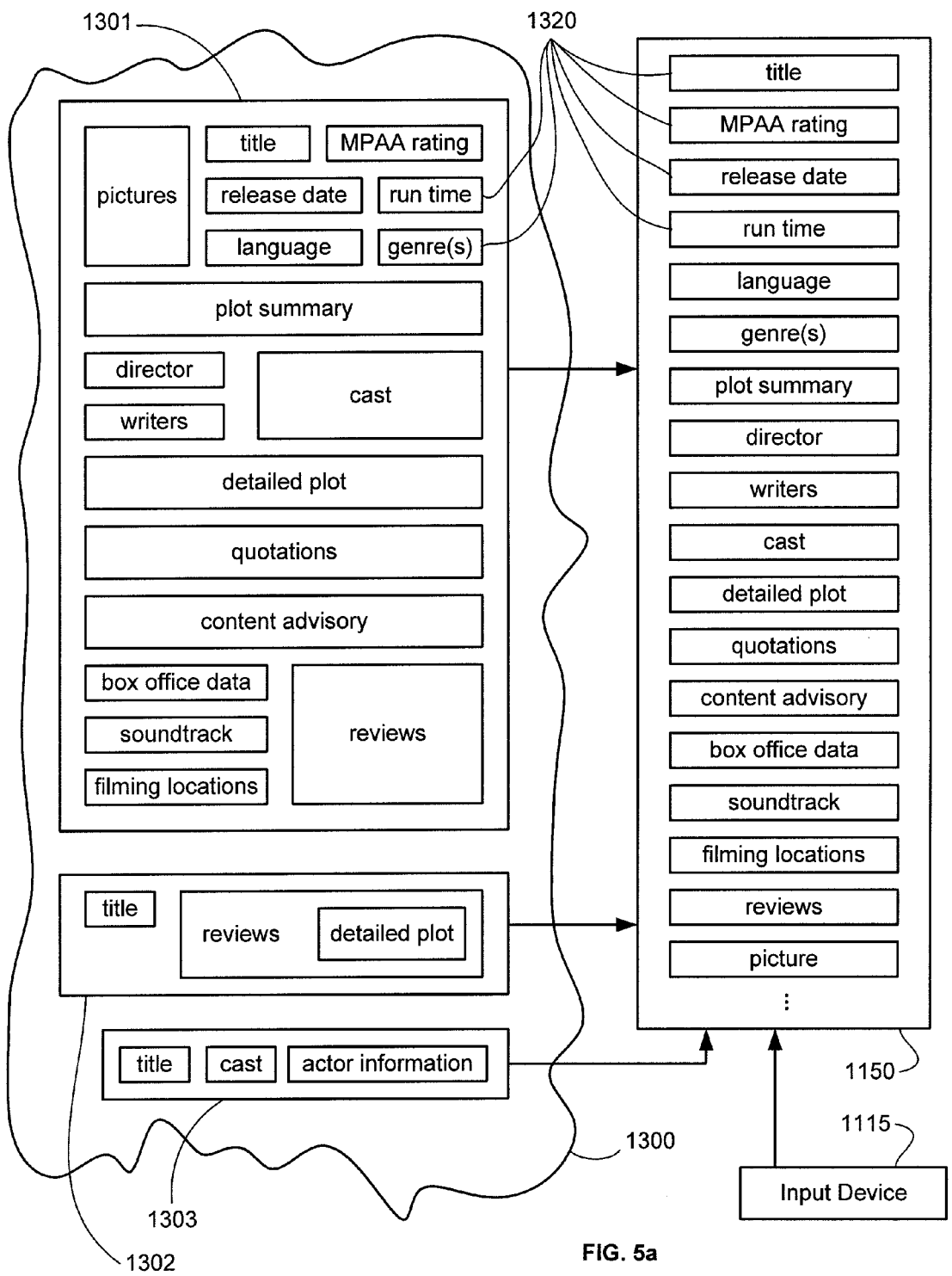
FIG. 5a shows creating/maintaining an encyclopedic database in the system of FIG. 2, according to one embodiment.

Creating/maintaining the encyclopedic database 1150 is illustrated at step S1150 in FIG. 4*a* and in FIG. 5*a*. FIG. 5*a* specifically shows the encyclopedic database 1150 obtaining content data 1320 from various websites 1301, 1302, 1303 on the network 1300, such as through web crawler software instructions, and also through the input device 1115.

The user library content file 1160 includes data distilled from the encyclopedic database 1150. Some of the data in the user library content file 1160 may be identical to data in the encyclopedic database 1150 (e.g., actor data, director data, writer data, title data, et cetera), and other data in the user library content file 1160 may be summaries, rankings, or other data processed from the data in the encyclopedic database 1150. The server software file 1180 may create the user library content file 1160 with or without human intervention.

Figure 5B:
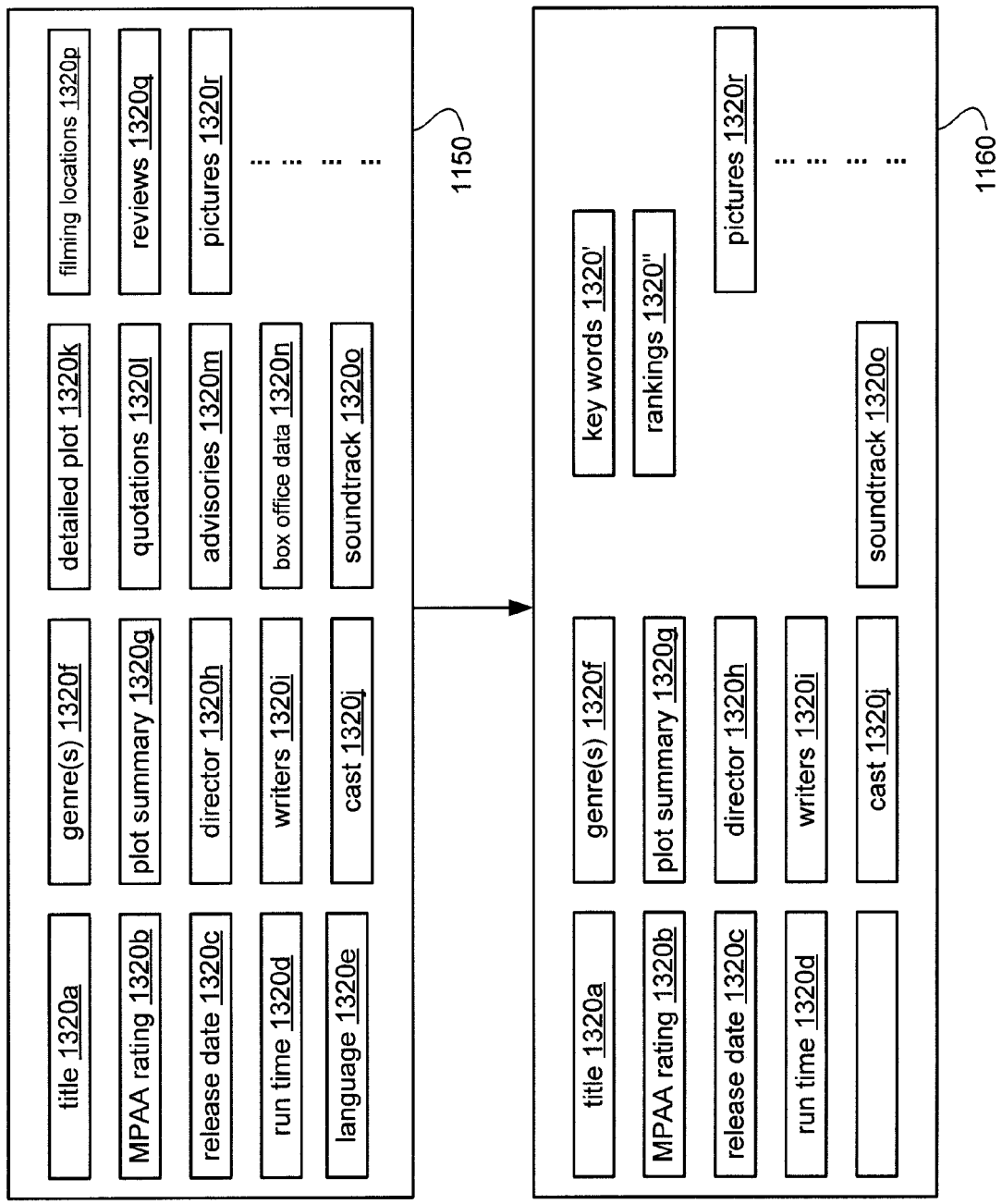
FIG. 5b shows creating/maintaining a user library content file in the system of FIG. 2, according to one embodiment.

Creating/maintaining the user library content file 1160 is illustrated at step S1160 in FIG. 4*a* and in FIG. 5*b*. FIG. 5*b* specifically shows the user library content file 1160 distilled from the encyclopedic database 1150 according to one embodiment. There, content data 1320 such as title data 1320*a*, MPAA rating data 1320*b*, release date 1320*c*, run time 1320*d*, language (or country of origin) data 1320*e*, genre data 1320*f*, plot summary data 1320*g*, director data 1320*h*, writer data 1320*i*, cast and crew data 1320*j*, soundtrack data 1320*o*, and picture data 1320*r* is substantially copied to the user library content file 1160; other content data 1320 such as detailed plot data 1320*k*, quotation data 1320*l*, content advisory data 1320*m*, box office data 1320*n*, and review data 1320*q* is transformed, for example, into key word data 1320' and ranking data 1320". In some embodiments, at least a portion of the ranking data 1320" is derived from content data 1320 that respectively includes rankings.

Returning to FIG. 2, the user software file 1170 includes computer instructions for operating the local device 1200, as discussed in further detail below, and the server software file 1180 includes computer instructions for operating the server 1100 as discussed above and below. Creating/maintaining the user software file 1170 in the server 1100 is illustrated at step S1170 in FIG. 4*a*. And among the various other instructions in the server software file 1180 may be instructions causing the processor 1105 to provide the updated user library content file 1160 and the updated user software file 1170 to the local device 1200 (via the communication device 1110), as illustrated at step S1180 in FIG. 4*a*. Alternately, the user software file 1170 may include instructions causing the user library content file 1160 and the user software file 1170 to be updated; or the files 1160, 1170 may be updated at the local device 1200 in other traditional manners.

Figure 2:
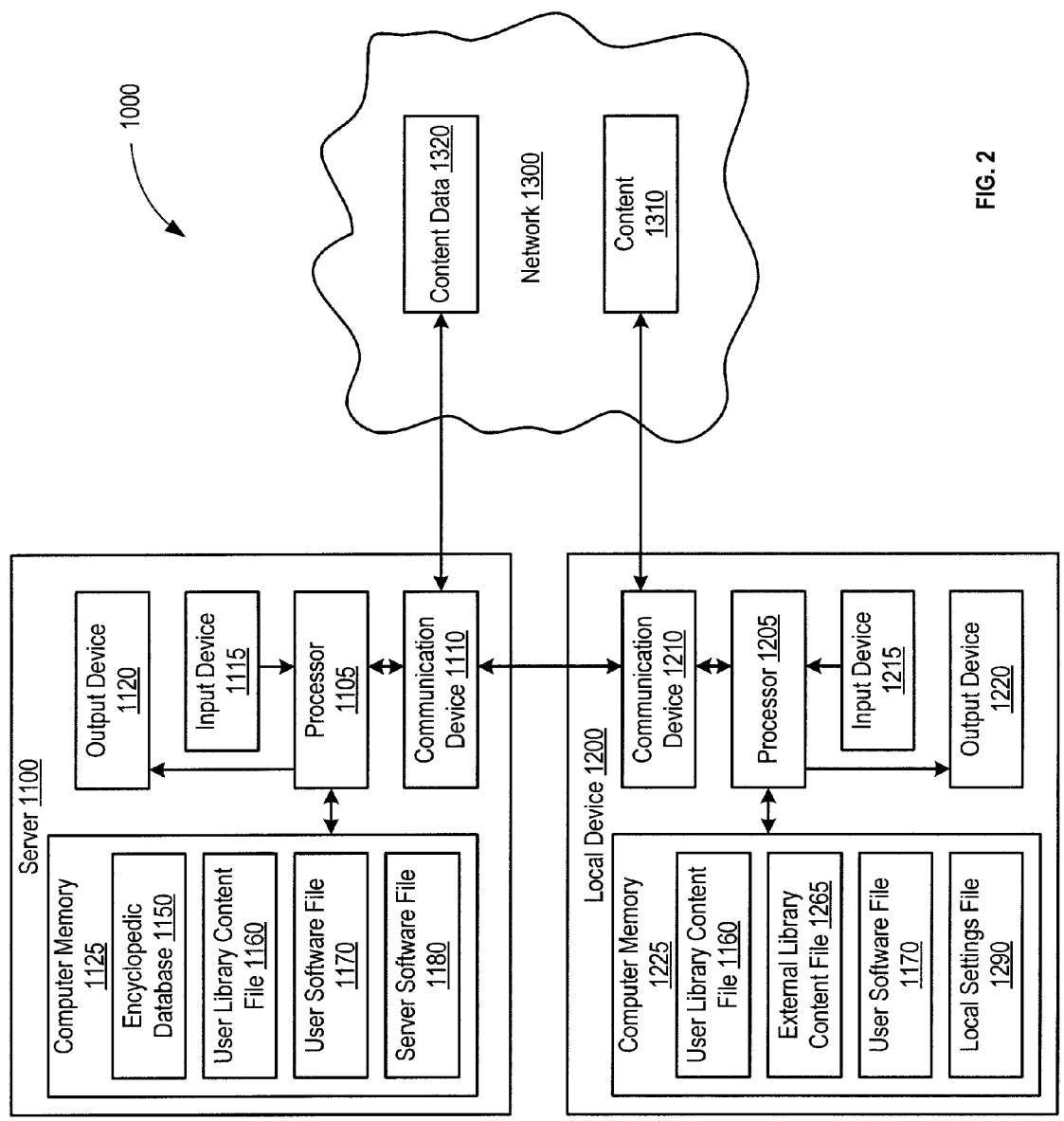
FIG. 2 shows a more detailed view of the system of FIG. 1, according to one embodiment.

Turning now to the local device 1200, though still with primary reference to FIG. 2, the local device 1200 may include a television with a set-top box, a personal computer, a tablet computer, et cetera. The local device 1200 includes a processor 1205 in data communication with a communication device 1210, an input device 1215, an output device 1220, and computer memory 1225. As noted above, reference to elements in the singular is used herein to refer to one or more of the elements unless specifically indicated to the contrary or apparent due to inoperativeness.

The communication device 1210 may be a modem or any other appropriate device, whether now existing or later developed, for allowing the processor 1205 to communicate with the server 1100 and the network 1300. In some embodiments, the communication device 1210 may be a single device for communicating with the server 1100 and the network 1300, while in other embodiments multiple devices may be used.

The input device 1215 and the output device 1220 may be any appropriate devices, whether now existing or later developed, for providing data to and presenting data from the processor 1205. For example, the input device 1215 may include a television remote control, a computer mouse, a touchpad, and/or a keyboard; and the output device 1220 may include a television screen, a display screen, et cetera. In some embodiments, the input device 1215 and the output device 1220 may be combined, such as through a touch screen.

Figure 4B:
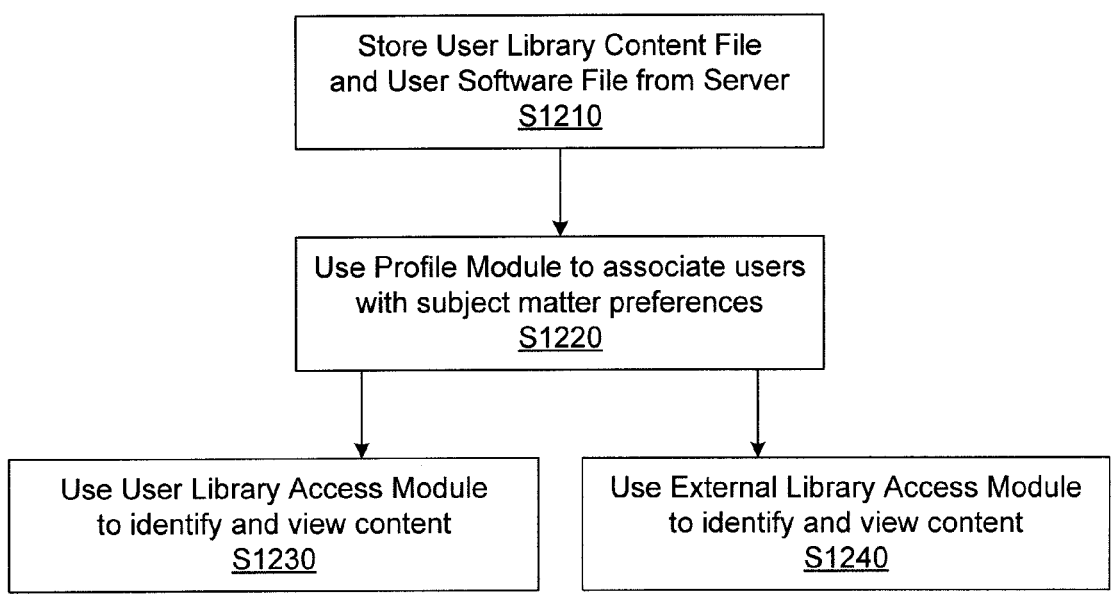
FIG. 4b shows high level steps associated with the local device of the system of FIG. 2 when in use.

The computer memory 1225 may include volatile and non-volatile memory, and any appropriate data storage devices whether now existing or later developed may be used. The computer memory 1225 may store a copy of the user library content file 1160, a copy of the user software file 1170, an external library content file 1265, and a local settings file 1290. Again, the files 1160, 1170, 1265, 1290 may include multiple files, as will be appreciated by those skilled in the art, and the use of the singular herein encompasses such multiple files. As illustrated in FIG. 4*b* at step S1210, the user library content file 1160 and the user software file 1170 may be obtained from the server 1100 and stored in the computer memory 1225.

Figure 3:
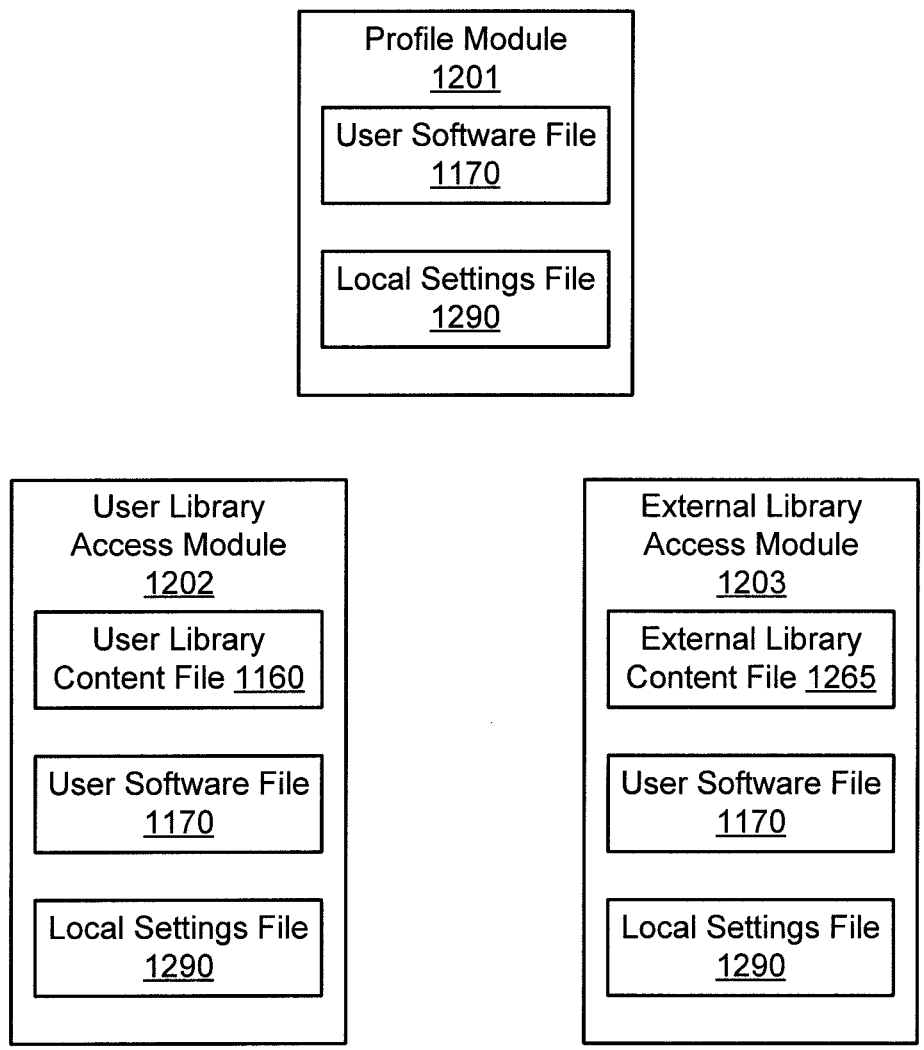
FIG. 3 shows various modules in the system of FIG. 2.

The various files in the computer memory 1225 are illustrated in FIG. 3 as conceptually separated into a profile module 1201, a user library access module 1202, and an external library access module 1203; each is addressed in turn. The profile module 1201 associates users with subject matter preferences 1295 and utilizes the user software file 1170 and the local settings file 1290. For example, each user may have a unique profile (inside the local settings file 1290) accessible using a unique login (e.g., passwords, biometric markers such as fingerprints, et cetera), and the user software file 1170 may be used to associate various preferences 1295 with the user profiles in the local settings file 1290. The various preferences 1295 may include, for example, settings related to violence 1295*a*, language 1295*b*, sex 1295*c*, mature themes 1295*d*, and an amount of content that may be viewed, preferences for how content is displayed, preferences for various genres, preferences for various actors, et cetera. Some of the preferences 1295 (e.g., settings 1295*a*, 1295*b*, 1295*c*, 1295*d*, displaying preferences, et cetera) may be input by the user, while other of the preferences (e.g., genre preferences, actor preferences, et cetera) may be input by the user and/or by the profile module 1201 (e.g., based on viewing history, search history, et cetera). An exemplary screen shot showing a user profile having various preferences 1295 selected is set forth in FIG. 6, and use of the profile module 1201 to associate users with subject matter preferences is illustrated in FIG. 4*b* at step S1220.

Moving on, the user library access module 1202 (FIG. 3) allows a user to search for and access a portion of the content 1310 on the network 1300, in accordance with his profile settings in the local settings file 1290. This is illustrated in FIG. 4*b* at step S1230. The user library access module 1202 utilizes the user library content file 1160, the user software file 1170, and the local settings file 1290; and the user software file 1170 specifically allows a user to search for and access content that is associated with data in the user library content file 1160, limited only by the user's particular profile settings in the local settings file 1290. Content that does not meet the requirements of the user's profile settings may be filtered out and thus not presented to the user. Content presented to the user may be displayed in accordance with preferences 1295 for how content is displayed. In some embodiments, preferences 1295 may affect the order in which content is displayed.

Once the user identifies content to access, a reference file (or "pointer file" or "link") in the user library content file 1160 may direct the processor 1205 to access the content 1310 on the network 1300. For example, the content 1310 may be accessed through Netflix, Hulu, or websites of other content providers. Because the user library content file 1160 may include detailed information about the content 1310, the associated content 1310 may be searched and filtered with great specificity regarding the subject matter and fine details of the content 1310. And in addition to resulting in superior output, searching and filtering based on the user library content file 1160 may provide substantial speed advantages over trying to search and analyze the content data 1320 directly from the network 1300.

The external library access module 1203 (FIG. 3) complements the user library access module 1202 and allows a user to search for and access a separate portion of the content 1310 on the network 1300, with consideration given to his profile settings in the local settings file 1290. This is illustrated in FIG. 4b at step S1240. The external library access module 1203 utilizes the external library content file 1265, the user software file 1170, and the local settings file 1290; and the user software file 1170 and the external library content file 1265 specifically allow a user to search for and access content that is not associated with data in the user library content file 1160 (or content that is associated with insufficient data in the user library content file 1160). For example, content 1310 that is accessible through YouTube and that has little or no associated content data 1320 (and thus little or no associated data in the user library content file 1160) may be searched and accessed.

Because of insufficient data about the content 1310 accessed through the external library access module 1203, the user's particular profile settings in the local settings file 1290 may not be directly utilized. Instead, the external library content file 1265 may reconcile the user's particular profile settings in the local settings file 1290 with filter settings in an external search engine that can identify and access the content 1310. Reconciliation may occur based on various principles, with the goal being to filter out truly unwanted content 1310 and provide access to acceptable content 1310.

A stringent reconciliation may ensure that the filter settings in an external search engine are at least sufficient to meet all of the restrictions in the user's particular profile settings in the local settings file 1290. For example, if an external search engine has four levels of filtering (with level four being most restrictive), if all but one of a user's profile settings are met by the settings in level two, and if the remaining setting is met by the settings in level four, the external library access module 1203 may activate level four of the external search engine filter. If an external search engine does not have filter settings that meet all of the restrictions in the user's profile settings, the external library access module 1203 may completely block access to the external search engine.

In a less stringent reconciliation, the external library access module 1203 may disregard one or more of the user's profile settings based on such factors as the degree to which the user's other profile settings are met by a particular filter setting in an external search engine, the identity of the particular profile setting that is not met by an external filter setting, et cetera. For example, if an external search engine has four levels of filtering (with level four being most restrictive), if all but one of a user's profile settings are met by the settings in level two, and if the remaining setting is met by the settings in level four, level two may be used unless the remaining profile setting is required to be met due to its specific identity (e.g., if the remaining setting is language-related, level two may be used; if the remaining setting is related to sexual content, use of level four may be required).

Whether the external library access module 1203 uses a stringent reconciliation or a less stringent reconciliation may depend on a user-selected setting in the local settings file 1290 or the external library content file 1265, or may be selected without user input. Similarly, the specific identity of user profile settings that must be met by an external search engine filter (e.g., sexual content in the example given above) may depend on user-selected settings in the local settings file 1290 or the external library content file 1265, or may be selected without user input. Once appropriate content 1310 is identified using the external search engine, the external search engine may be used to access the content 1310. Although the content 1310 accessible through the external library access module 1203 may not be searched and filtered to the extent of the content 1310 accessible through the user library access module 1202, it may nevertheless be desirable to provide access to this additional multimedia content.

The following description is an example of the system 100 in use according to an embodiment. At the step 1220, a user may create a profile through the profile module 1201, associating the user with subject matter preferences 1295. As shown in FIG. 6, for example, levels of violence 1295a, language 1295b, sexual content 1295c, and mature themes 1295d may be selected.

At the step S1150, the encyclopedic database 1150 may be created/maintained to include, among a myriad of other data, the following data 1320 about every movie and TV show in which Tom Hanks acted, directed, produced, wrote, or performed in a soundtrack, and about every movie and TV show in which the name "Tom Hanks" is used or mentioned: title data 1320a, MPAA rating data 1320b, release date 1320c, run time 1320d, language (or country of origin) data 1320e, genre data 1320f, plot summary data 1320g, director data 1320h, writer data 1320i, cast and crew data 1320j, detailed plot data 1320k, quotation data 1320l, content advisory data 1320m, box office data 1320n, soundtrack data 1320o, filming location data 1320p, review data 1320q, ranking data, and script data.

From there, at the step S1160, the user library content file 1160 is distilled from the encyclopedic database 1150. In the distilling process, some of the content data 1320 may be substantially copied to the user library content file 1160 (e.g., title data 1320a, MPAA rating data 1320b, release date 1320c, run time 1320d, language (or country of origin) data 1320e, genre data 1320f, plot summary data 1320g, director data 1320h, writer data 1320i, cast data 1320j, soundtrack data 1320o, and filming location data 1320p); and other content data 1320 (e.g., detailed plot data 1320k, quotation data 1320l, content advisory data 1320m, box office data 1320n, review data 1320q, ranking data, and script data) may be transformed (e.g., into key word data 1320' and ranking data 1320").

By accessing the user library content file 1160 and the stored profile settings in the local settings file 1290, the user library access module 1202 can search and filter the content 1310 associated with the content data 1320 at a very fine level. For example, by searching for "Tom Hanks", all of the content 1310 in which Tom Hanks acted, directed, produced, wrote, or performed in a soundtrack, and all of the content 1310 in which the name "Tom Hanks" is used or mentioned may be filtered in accordance with the profile settings and then presented by the user library access module 1202. The order in which the user library access module 1202 presents the filtered results may be selected based on various predetermined rules; for example, content 1310 in which Tom Hanks acted may be presented before content 1310 in which Tom Hanks produced and content 1310 in which "Tom Hanks" is mentioned. So "Forrest Gump" (a film in which Tom Hanks was an actor) may be displayed before "Where The Wild Things Are" (a film in which Tom Hanks was a producer) and "Bamboo Shark" (a film that mentions "Tom Hanks"). Because the user library access module 1202 references the user library content file 1160, films such as "Catch Me If You Can" (a film in which Tom Hanks was an actor) may be filtered out for including smoking if the user profile does not allow smoking to be shown. For another example, "Apollo 13" (a film in which Tom Hanks was an actor) may be one of many results in a user search for "moon", "lunar", "astronaut", "NASA", or "survive"—assuming the profile settings do not require "Apollo 13" to be filtered out of the results. A reference file in the user library content file 1160 may direct the processor 1205 to access the content 1310 on the network 1300 once the content 1310 is selected.

To search for content 1310 which is not adequately described in the user library content file 1160, the external library access module 1203 may be utilized. For example, the external library content file 1265 may reconcile the user's particular profile settings in the local settings file 1290 with filter settings in a YouTube search engine. The YouTube search engine (with its filter settings appropriately engaged) may then be used to identify and access content 1310.

Figure 7:
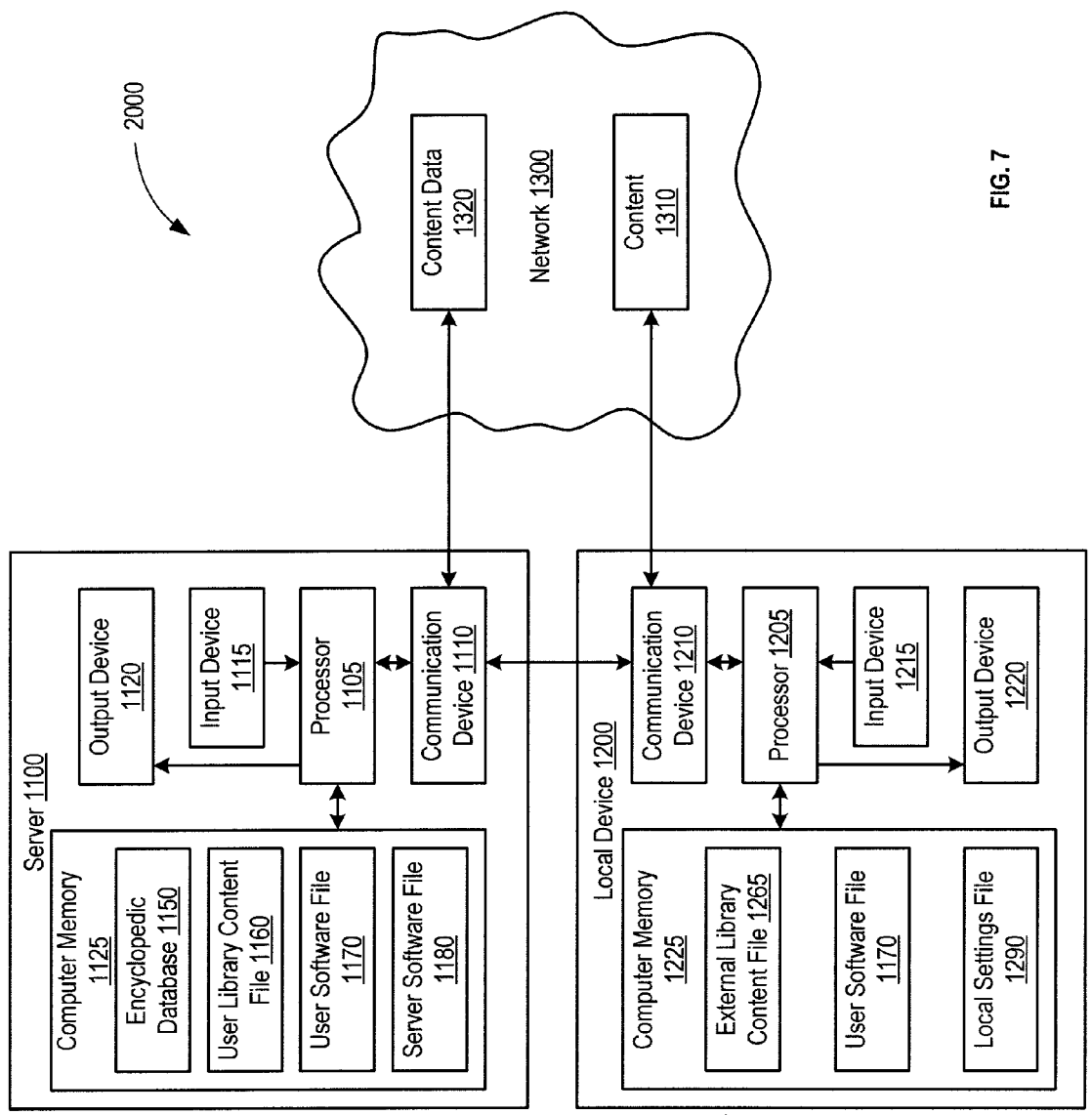
FIG. 7 shows a more detailed view of the system of FIG. 1, according to another embodiment.

FIG. 7 shows another embodiment 2000 of the inventive system 100 that is substantially similar to the embodiment 1000, except as specifically noted and/or shown, or as would be inherent. Further, those skilled in the art will appreciate that the embodiment 1000 (and thus the embodiment 2000) may be modified in various ways, such as through incorporating all or part of any of the various described elements, for example. For uniformity and brevity, corresponding reference numbers may be used to indicate corresponding parts, though with any noted deviations.

In embodiment 2000, the user library content file 1160 remains solely on the server 1100 (and not on the local device 1200). As such, the local device 1200 accesses the user library content file 1160 at the server 1100 (via the communication device 1210) for using the user library content file 1160. This arrangement may be desirable, for example, to eliminate periodic updating of the user library content file 1160 at the local device 1200, to retain exclusive control of the user library content file 1160, or if the local device 1200 has very limited computer memory capacity. Similarly, though not shown in FIG. 7, those skilled in the art will appreciate that the local settings file 1290 may be located on the server 1100 in addition to, or instead of, on the local device 1200.

Figure 8:
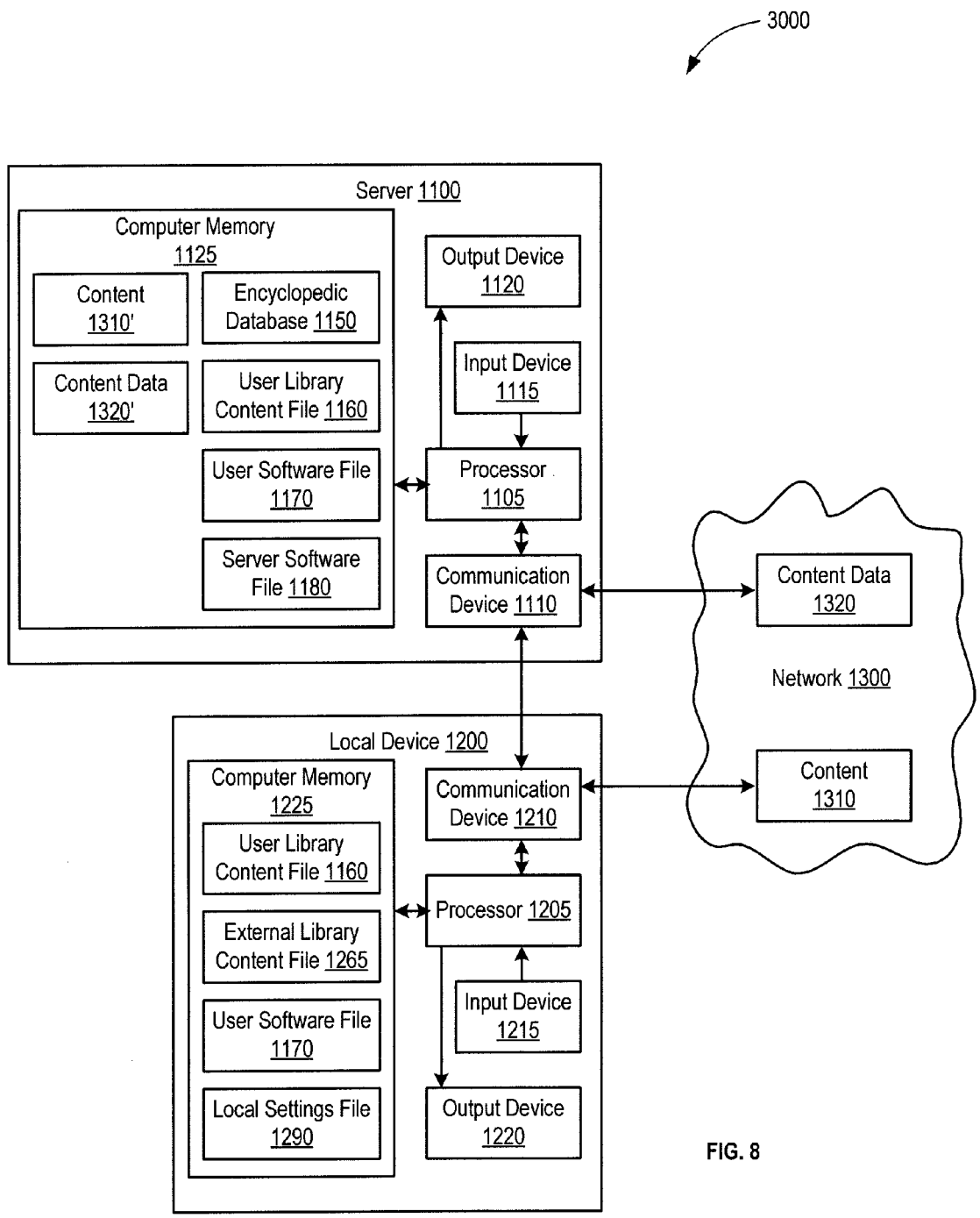
FIG. 8 shows a more detailed view of the system of FIG. 1, according to still another embodiment.

FIG. 8 shows still another embodiment 3000 of the inventive system 100 that is substantially similar to the embodiment 1000, except as specifically noted and/or shown, or as would be inherent. Further, those skilled in the art will appreciate that the embodiment 1000 (and thus the embodiment 3000) may be modified in various ways, such as through incorporating all or part of any of the various described elements, for example. For uniformity and brevity, corresponding reference numbers may be used to indicate corresponding parts, though with any noted deviations.

In embodiment 3000, content 1310' and content data 1320'—which may be generally similar to the content 1310 and the content data 1320, respectively—is housed on the server 1100. The encyclopedic database 1150 may include an extensive accumulation of data about the substance of the content 1310', just as it does about the content 1310; and the distilled data in the user library content file 1160 may relate to the content 1310', just as it does to the content 1310. Moreover, the user library access module 1202 may allow a user to search for and access the content 1310', just as it allows access to a portion of the content 1310 on the network 1300. Accordingly, the primary affect of the location of the content 1310, 1310' may simply be that reference files may point to the server 1100 to access the content 1310', and may point to the network 1300 to access the content 1310.

Similarly, though not shown in FIG. 8, those skilled in the art will appreciate that the content 1310' may be located in the local device 1200, may be accessed through a cable television service or a satellite television service, or may otherwise be located remote from the server 1100 and the local device 1200. Further, the content data 1320' may be located on the local device 1200, may be accessed from a remote location outside the network 1300 (e.g., through a cable television service or a satellite television service), or may be present on the network 1300.

Figure 9:
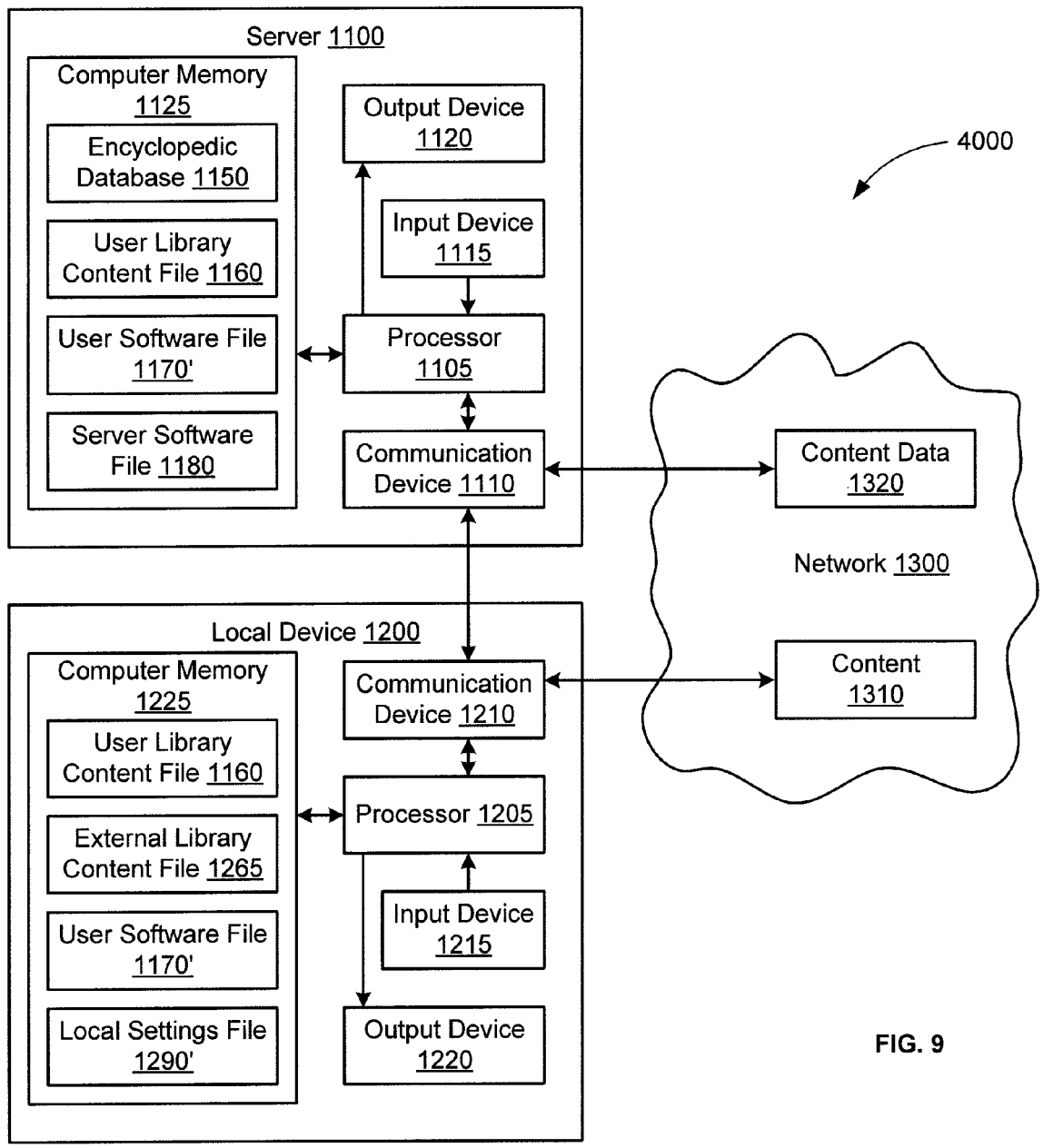
FIG. 9 shows a more detailed view of the system of FIG. 1, according to yet another embodiment.

FIG. 9 shows yet another embodiment 4000 of the inventive system 100 that is substantially similar to the embodiment 1000, except as specifically noted and/or shown, or as would be inherent. Further, those skilled in the art will appreciate that the embodiment 1000 (and thus the embodiment 4000) may be modified in various ways, such as through incorporating all or part of any of the various described elements, for example. For uniformity and brevity, corresponding reference numbers may be used to indicate corresponding parts, though with any noted deviations.

In embodiment 4000, local settings file 1290' and user software file 1170'—which may include the functionality as discussed above with respect to the local settings file 1290 and the user software file 1170, respectively—may also allow for the automatic playback of content 1310 on the output device 1220 based on a user's preferences.

Specifically, as discussed above, the profile module 1201 (FIG. 3) may allow a user to search for specific content 1310 by using the user library access module 1202 and the external library access module 1203. This content 1310 may be retrieved for playback on the output device 1220 from various sources; for example, the content 1310 may be retrieved from a variety of websites and web servers (e.g., Netflix, iFilms, Hulu, and Vudu), cable television providers (e.g., AT&T, Comcast, and Verizon), satellite television providers (e.g., Direct TV, Dish, and Mr. Satellite), et cetera. For sources such as cable, satellite, and over-the-air television broadcasts, digital video recorders (DVRs) may be employed to capture desired content for subsequent viewing.

Many sources may require that certain prerequisites be met before some or all of the content 1310 is accessible by the user. For example, Netflix may require that the user set up an account on Netflix and pay a fee before accessing any content 1310. Or, for example, Comcast may require that the user enter a pin before accessing certain content 1310 (e.g., movies on demand). The user may have different user names, passwords, pins, et cetera, for accessing the content 1310 from these various sources, and repeated entry of these usernames, passwords, pins, et cetera, to access the content 1310 may get tiresome. Moreover, some users, due for example to age or disability, may have difficulty with entering (or be unable to enter) such information and choosing between the content sources. Difficulties may further arise from the ever expanding sources of content, as some users may find it challenging or unpleasant to keep track of, obtain access to, and/or choose between the numerous content sources.

Figure 10A:
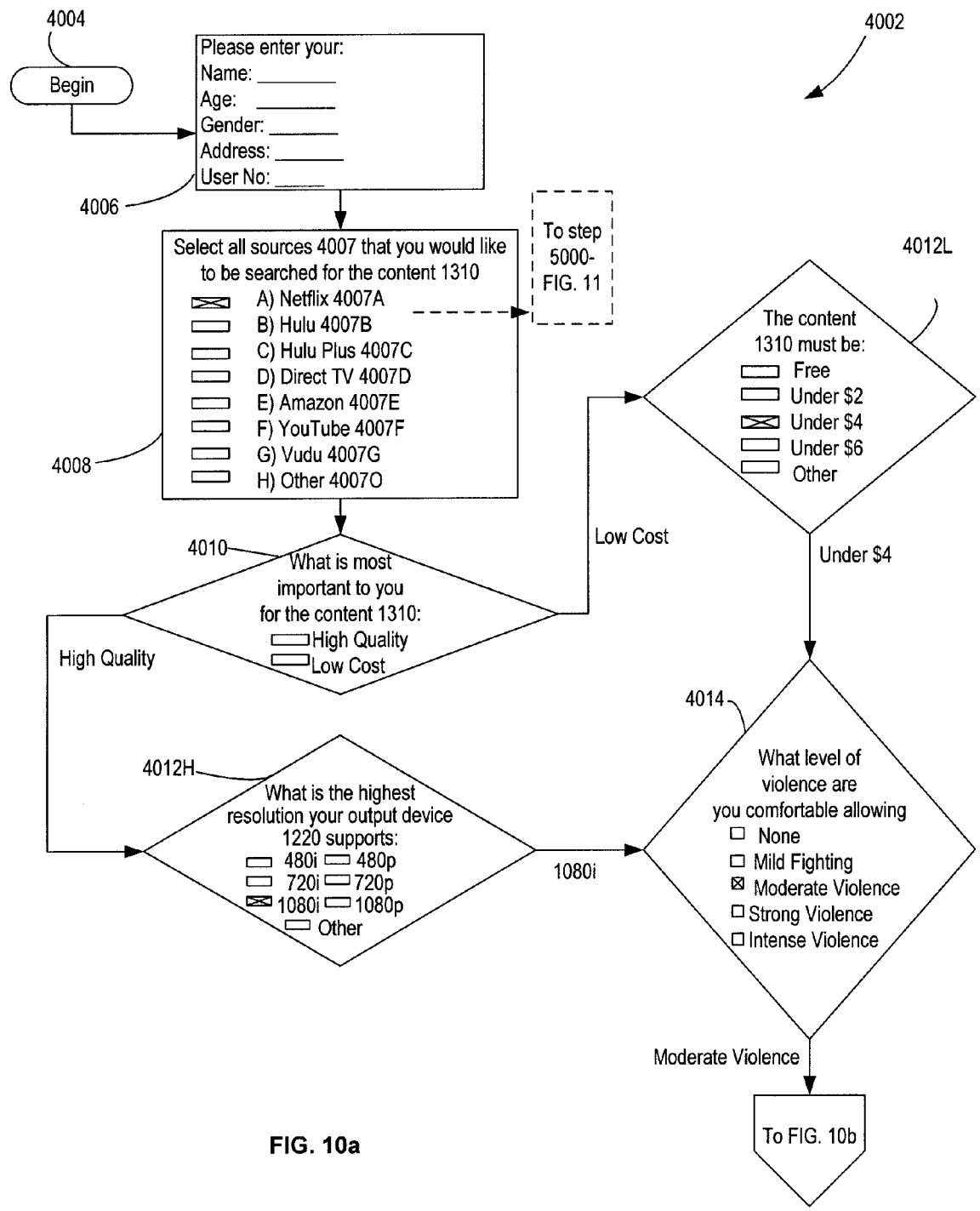
FIGS. 10a and 10b collectively show an exemplary set of steps performed by the system of FIG. 9.
Figure 10B:
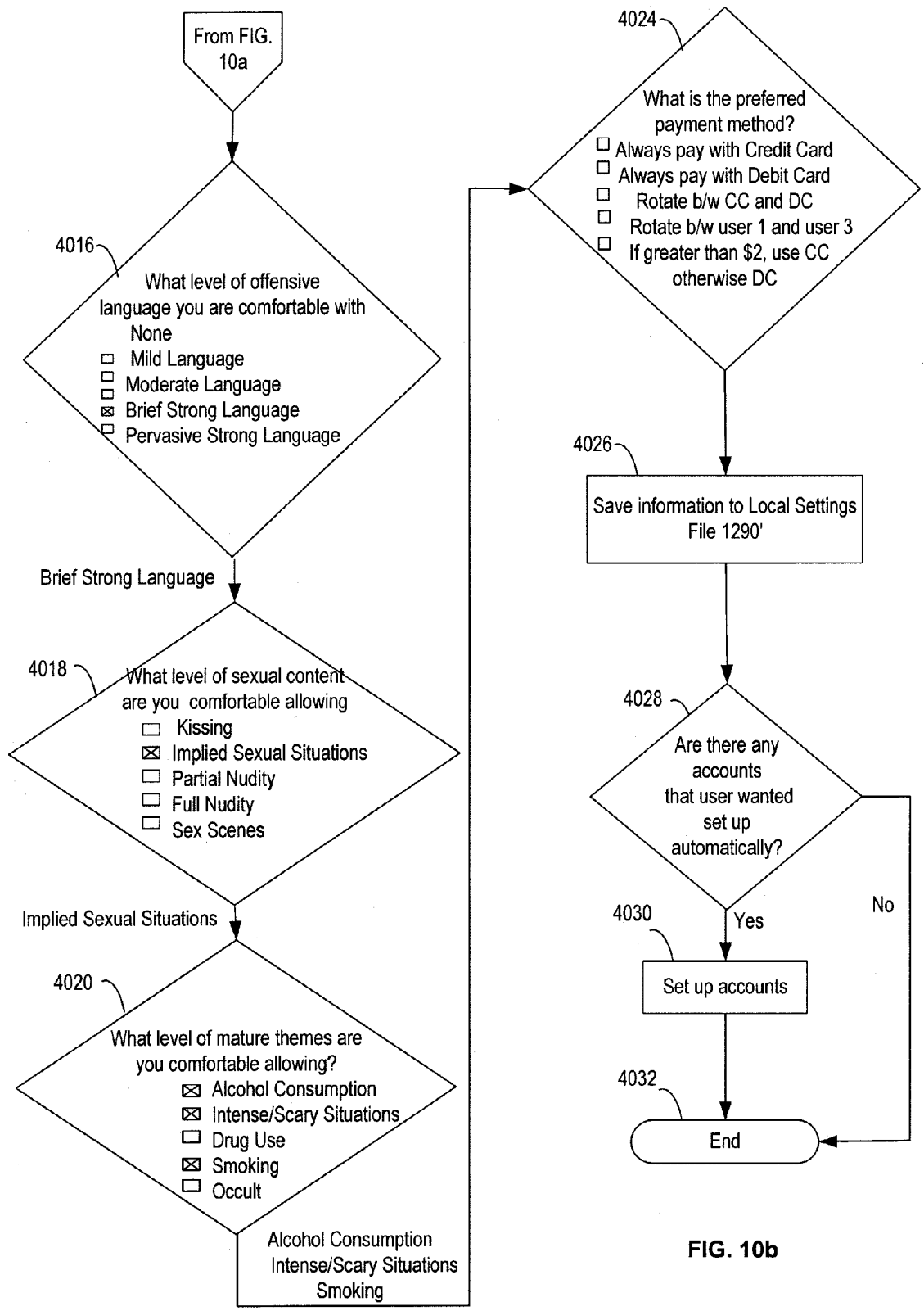

Attention is now directed to FIGS. 10a and 10b. The profile module 120 (FIG. 3) may be configured to run an automatic playback program 4002. The automatic playback program 4002 may be stored in the user software file 1170' or may reside elsewhere within the computer memory 1225, or may be otherwise accessible by the computer memory 1225 (e.g., over a network or via one or more external drives). A user may utilize the input device 1215 to run the automatic playback program 4002, though it may be preferable for the local device 1200 to automatically run the program 4002 (e.g., when the user initially sets up and configures the local device 1200 for use).

As shown in FIG. 10a, the automatic playback program 4002 may start at step 4004, and at step 4006 may ask the user to enter his name, age, gender, and address. These (and other) queries may, for example, be displayed on the output device 1220, and the user may enter his information via the input device 1215. The program 4002 may also ask the user at step 4006 to enter his user identification (e.g., a user number or name). As will become clear from the disclosure below, the program 4002 may allow multiple users to save their information and preferences to the local setting file 1290'. In some embodiments, the user may enter that he is the primary user (i.e., user 1), the secondary user (i.e., user 2), et cetera.

Then, at step 4008, the program 4002 may ask the user to select sources 4007 that he would like to be searched for the content 1310. Only by way of example, the program 4002 may ask the user to select one or more sources 4007 from the list comprising Netflix 4007A, Hulu 4007B, Hulu Plus 4007C, Direct TV 4007D, Amazon 4007E, YouTube 4007F, and Vudu 4007G. The user may select one or all of the sources 4007. As noted above, some or all of these sources 4007 may require that the user meet certain prerequisites (e.g., set up an account, pay a fee, enter his age, enter a pin, et cetera) before the content 1310 from these sources 4007 becomes accessible to the user. Assume, for purposes of illustration, that the user selects Netflix 4007A. The program 4002 may then move on to step 5000 (FIG. 11).

Specifically, once the user selects a specific source 4007 (e.g., Netflix 4007A) at step 4008, the program 4002, at step 5002, may ask the user whether he already has an account set up on that source 4007 (e.g., Netflix 4007A). If the user indicates that he already has an account set up on Netflix 4007A, the program 4002 may move to step 5004A and ask the user to enter his Netflix username and password. Then, at step 5006A, the program 4002 may save the user's Netflix signup information and return to step 4008. Alternatively, if the user indicates at step 5002 that he does not have an account on Netflix 4007A, the program 4002 at step 5004 may ask whether the user wishes to set up an account on Netflix 4007A. If the user indicates that he does not want to set up an account on Netflix 4007A, the program 4002 may move to step 5006B and save this information in the local settings file 1290' (i.e., save in the local settings file 1290' that the user does not have and does not want an account on Netflix 4007A). If, on the other hand, the user indicates at step 5004 that he would like to set up an account on Netflix 4007A, the program 4002 may ask the user at step 5006 whether the user would like to set up the account on Netflix 4007A manually, or whether he would like the account to be setup automatically.

If the user indicates that he would like to set up an account on Netflix 4007A manually, the program 4002 at step 5008M may take user to the Netflix signup page so that the user may manually set up the account. After the user sets up his Netflix account, the program 4002 may save the user's Netflix username and password in the local settings file 1290' and return to step 4008 (FIG. 10a). If, however, the user indicates that he would like the account on Netflix 4007A to be setup automatically, the program 4002 at step 5008A may save in the local settings file 1290' the user's preference to set up automatically the Netflix account and return to step 4008.

Figure 11:
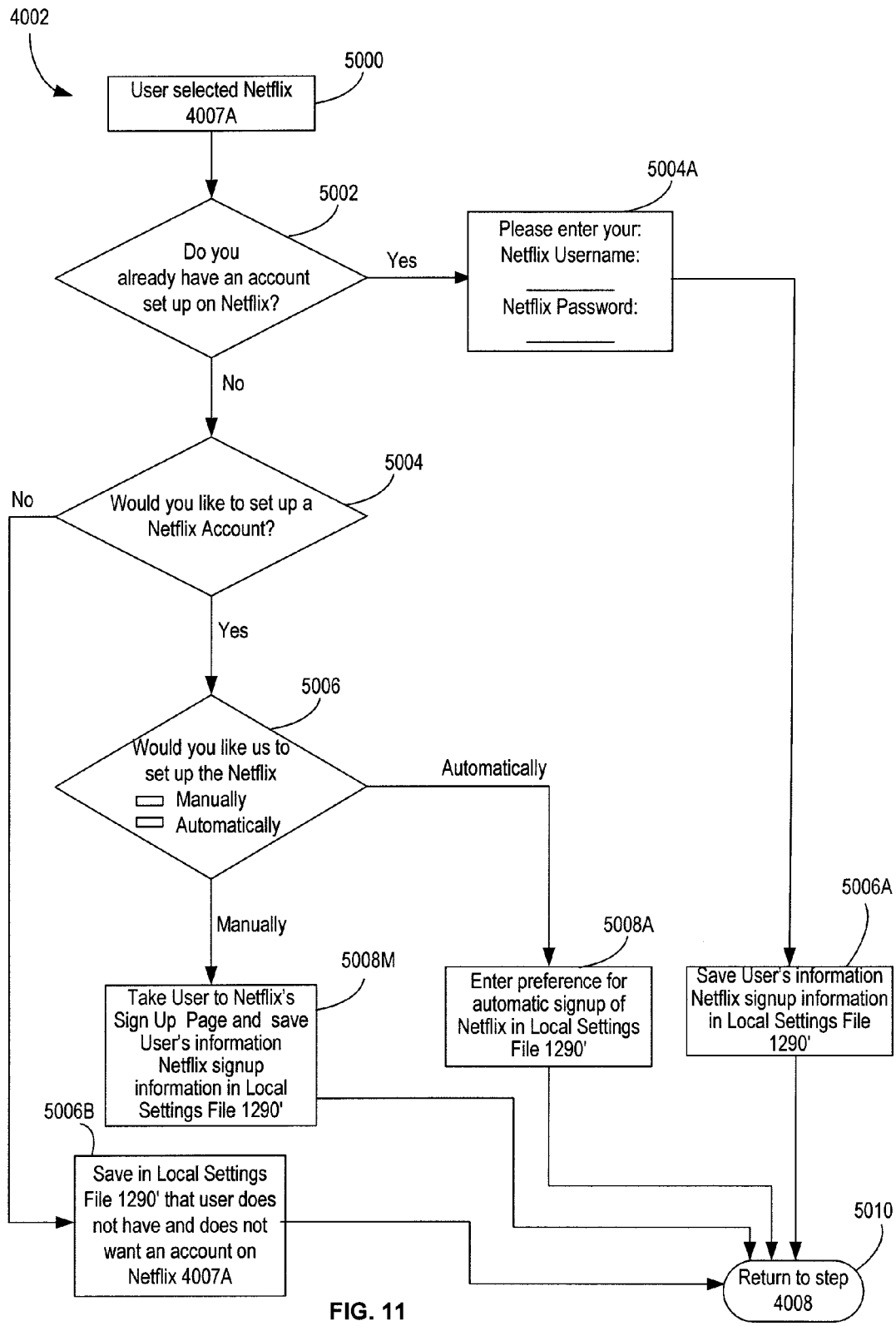
FIG. 11 shows another exemplary set of steps performed by the system of FIG. 9.

It will be appreciated by those skilled in the art that while FIG. 11 refers to Netflix, the user's preferences and information regarding other sources 4007 may similarly be gathered by the program 4002. For example, the user may also choose Direct TV 4007D, in which case, the program 4002 may prompt the user to enter his video on-demand pin. The program 4002 may also allow the user at step 4008 to enter any other sources 4007O which the user would like to be searched for the content 1310. The other sources 4007O option may allow the user to enter any sources 4007 for the content 1310 that have not already been considered or automatically identified by the program 4002. The user may, for example, after selecting the other option 4007O, enter the website address for Fastpasstv. Or, for example, the user may have an account on iFilms; and by selecting the other option 4007O, he may set up his iFilm account for use by the local device 1200.

It will also be appreciated by those skilled in the art that the popularity of the sources 4007 may change from time to time. For example, certain sources 4007 may become more popular over time because they increase their content and/or decrease their fees. Other sources 4007, for example, may become less popular because of the lack of recent content. And still other sources 4007 may shut down. The program 4002 may keep track of the status of the sources 1407 (e.g., by accessing the network 1300), and only display those sources which are currently functional and in demand, so that the user does not have to unnecessarily scroll through less desirable sources 4007. But of course the user may enter and access any source 4007 by using the other option 4007O.

After the user has entered the information regarding the sources 4007 in step 4008, the program 4002 at step 4010 may ask the user about his preferences. For example, the program 4002 may ask whether the high quality or the low cost of the content 1310 is more important to him. As will be appreciated, certain users may wish to never compromise on the audio and video quality of the content 1310, and may indicate that high quality of the content 1310 is more important than lower cost. The program 4002 may then move to step 4012H and ask the user for the highest resolution that his output device 1220 supports. Only by way of example, the user may be given options such as 480i, 480p, 720i, 720p, 1080i, 1080p, et cetera. The user may select the highest resolution that his output device 1220 supports, and the program may then move on to step 4014. The program 4002 may also allow the user to enter any other preferences regarding the quality of the content 1310 (e.g., the user may enter that he prefers black and white content 1310, 3D content, et cetera).

If at step 4010 the user indicates that lower cost of the content 1310 is more important, the program 4002 may move to step 4012L and ask the user about the maximum cost that he is willing to incur for the content 1310. For example, the program 4002 may ask whether the user wishes only to access content 1310 that is free, under $2 (e.g., under $2 per season, per show, per hour, per movie, et cetera), under $4, under $6, et cetera. The program 4002 may also allow the user to enter other preferences related to costs in step 4012L. For example, the user may enter that he wishes to pay up to $5 for full HD content 1310, but that otherwise, the content 1310 must be under $2.

Next, at steps 4014-4020, the program 4002 may ask the user about preferences 1295, such as discussed above. For example, at step 4014 the program 4002 may ask the user about the level of violence that he is comfortable viewing (e.g., mild fighting, moderate violence, strong violence, intense violence, no violence, et cetera). After the user enters his preference for violence of the content 1310 at step 4014, the program may at step 4016 ask the user what level of offensive language he is comfortable with (e.g., none, mild language, moderate language, brief strong language, pervasive strong language, et cetera). At step 4018, the program 4002 may ask the user about the sexual content that he is comfortable viewing (e.g., kissing, implied sexual situations, partial nudity, full nudity, sex scenes, et cetera), and at step 4020, the program 4002 may ask the user what level of mature themes he is comfortable viewing (e.g., is he comfortable viewing alcohol consumption, intense situations, drug use, smoking, occult themes, et cetera). Once the user enters this information, the program 4002 moves on to step 4024. Based on a user's particular information, certain preferences may be made unavailable; for example, a user that is 15 years old may be disallowed from entering that he is comfortable with sex scenes, drug use, pervasive strong language, et cetera. Selections made through an administrator profile and/or preset selections triggered by profile data (e.g., age) may prevent predetermined selections from being made, or automatically make predetermined selections.

At step 4024, the program 4002 may inquire about the user's payment preferences (assuming that the user has not limited the content 1310 only to free content). The program 4002 may provide the user with several payment options. Only by way of example, the program 4002 may ask whether the user wishes to always pay for the content by a credit card, or by a debit card, or whether the user wishes the payments to be alternatively charged to the debit and credit card. The program 4002 may also allow for entry of the user's credit card and debit card information, which information may securely be stored, for example, in the local settings file 1225. In some embodiments, this sensitive information may be stored offline for safety (e.g., in a hard drive in the device 1200 that is accessible by the processor 1205 but which is otherwise blocked from being accessed over the network 1300).

The program 4002 may allow the user to rotate payments between the various users. For example, the program 4002 may apply a credit card of the first user to pay for one episode of a show, and then a debit card of a third user to pay for a second episode of a show. The program 4002 may first obtain the consent of all the paying users before allowing this option to be exercised. Other payment variations may also be available. For example, a user may ask the program 4002 to charge his debit card for payments under $2 and his credit card for larger payments.

After the user enters the payment options in step 4024, the program 4002 may move on to step 4026 and store the information provided by the user in the local settings file 1290'. At step 4028, the program 4002 may check whether the user wanted a source account to be set up automatically (e.g., a Netflix account 4007A, a Hulu Plus account 4007C, a YouTube account 4007F, et cetera). If so, the program 4002 may set up these accounts, taking into account the various information gathered by the program 4002. For example, the program 4002 may generate a Netflix username for the user based on his name, a Netflix password based on his address, and make any required payments based on the payment information entered by the user in step 4024. The program 4002 may then end at step 4032. As those skilled in the art will appreciate, various described steps may be omitted or rearranged in various embodiments, and additional steps may be added.

As noted, the user software file 1170', akin to the user software file 1170 of embodiment 1000, may include instructions for operating the local device 1200. In embodiment 1000, if a user searches for particular content 1310, the profile module 1201, in conjunction with the user library access module 1202 (FIG. 3) and/or the external library access module 1203, may be used to find this content 1310; and then, in accordance with the various preferences 1295 of the user as saved in the local settings file 1290, the content 1310 may be listed for selection by the user (e.g., the content 1310 may be listed in the order that it meets the user's preferences). In embodiment 4000, on the other hand, by utilizing the user's information as obtained by the program 4002, the content 1310 may automatically be displayed on the output device 1220.

Consider, for example, a user John Doe having a profile 6000 as shown in FIG. 12. As can be seen, John Doe is a male of age 20, and John Doe is the primary user of the device 1200. John Doe wants Netflix 4007A, Hulu Plus 4007C, Direct TV 4007D, and Fastpasstv to be searched for the content 1310. Higher quality of the content 1310 is more important to John Doe as compared to lower cost. His output device 1220 is capable of playing full HD (1080P). John Doe is comfortable with intense violence, pervasive strong language, sex scenes, and all mature themes. John Doe's preferred method of payment is a PayPal account, unless the content 1310 costs more than $5, in which case he wants his credit card to be charged.

Assume now that John Doe searches for the movie "Drive." The module 1202 and/or 1203 may thus search for this movie on Netflix 4007A, Hulu Plus 4007C, Direct TV 4007D, and Fastpasstv. Assume that Netflix 4007A includes this movie in 720p resolution, Hulu Plus 4007C includes this movie in 420p resolution, Direct TV 4007D includes this movie in 1080p resolution, and that Fastpasstv does not include this movie. The user software file 1290', based on John Doe's preferences, may select this movie from Direct TV 4007D. For example, the user software file 1170 may access Direct TV and automatically enter John Doe's Direct TV pin as required by Direct TV. The user software file 1170 may then also automatically display this movie on the output device 1220, and if required, pay the required fees according to John Doe's preferences. In this manner, the need for John Doe to search through the various sources 4007 to find the content 1310 that best fits his preferences is eliminated. As will be appreciated, the profile 6000 need only be saved once, and may thereafter be automatically utilized to repeatedly find and display the requested content 1310. However, the profile 6000 may be edited as desired (e.g., to accommodate a change in preferences).

Consider now, for example, a profile 6002 of a user Jane Doe, as depicted in FIG. 13. As can be seen, Jane Doe is an 18 year old female, and is the secondary user of the device 1200. Various settings in the setup process may be "box-level", meaning that the information is constant across all user profiles and need only be entered once (e.g., address, cable television provider, TV resolution). Jane Doe is more concerned with cost of the content 1310 than its quality, and does not wish to pay over $2 for the content 1310. Her output device 1220 displays up to 420p resolution. She is comfortable with mild fighting (with respect to violence), kissing (with respect to sexual content), and smoking (with respect to mature themes). Jane Doe is not comfortable with any offensive language.

Assume now that Jane Doe searches for "car chases." The module 1202 and/or 1203 may thus search for content 1310 that includes or relates to car chases on Netflix 4007A, Hulu Plus 4007C, Direct TV 4007D, and YouTube 4007F. Assume that the encyclopedic database 1150 indicates that the movie "Drive" is most closely related to these search terms. The profile module 1201 may thus crosscheck the movie "Drive" with Jane Doe's profile 6002, and then, because this movie contains strong violence, continue searching for other content 1310. Consider, for example, that the encyclopedic database 1150 suggests that the movie "Herbie" is most closely related to the search terms after the movie "Drive." The profile module 1201, after ensuring that the movie "Herbie" does not run afoul of any preferences set by Jane Doe, may search for "Herbie" on Netflix 4007A, Hulu Plus 4007C, Direct TV 4007D, and YouTube 4007F. Assume that Netflix 4007A includes this movie in 1080i resolution, Hulu Plus 4007C includes this movie in 1080p resolution for free, Direct TV 4007D includes this movie in 480p resolution for $5, and that YouTube includes this movie in 420p resolution for free. Based on Jane Doe's preferences, the embodiment 4000 may then automatically display the movie "Herbie" from YouTube.

By automatically displaying the content 1310 that best fits the user's preferences, the embodiment 4000 may eliminate the need for users to: (1) repetitively enter their user names, passwords, pins, et cetera to access the content 1310 from the various sources 4007; (2) scroll through long lists of the content 1310 from the various sources 1407, including content 1310 that is unsuitable (e.g., exceeds the user's comfort with violence, sex, or is too costly, et cetera) and/or unplayable (e.g., of a resolution higher than that supported by the output device 1220); and (3) repetitively enter information regarding payment (e.g., credit card information, debit card information, et cetera). In some embodiments, a budget (e.g., a monthly budget or a weekly budget) may be associated with profiles during the setup of preferences (e.g., by the administrator profile), and the system may block all but free content once the budget is reached. This may provide a safeguard from large, unwanted charges. And as should be clear, some user profiles (e.g., children profiles) may be configured to always block all but free content.

For situations in which multiple content sources have the same cost and output quality attributes (e.g., if Netflix 4007A, Direct TV 4007D, and You Tube 4007F include the same desired content at the same cost and resolution), the source may be automatically chosen among those results by selecting the source that has the most reliable transmissions, the fastest transmissions, the soonest transmission, a preferential relationship with an operator of the system 4000, et cetera.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. While various files and software have been described as enabling specific functions, those skilled in the art will appreciate that files and software may be commingled or further segregated, and that specific file or software labels are used for convenience.

What is claimed is:

1. A system for automatically selecting a content source from multiple content sources and displaying the multimedia content from the selected content source, the system comprising:
    at least one non-transitory computer memory;
    at least one processor in data communication with the at least one computer memory, an input device, and an output device;
    programming causing the at least one computer memory to store a first user profile and a second user profile; the first user profile including personal settings relating to filtering content based on data for a first user received through the input device; the first user profile including a selected hierarchy of content source attributes based on data for the first user received through the input device; the second user profile including personal settings relating to filtering content based on data for a second user received through the input device; the second user profile including a selected hierarchy of content source attributes based on data for the second user received through the input device;
    programming allowing the first user to select multimedia content from a plurality of multimedia content meeting the personal settings relating to filtering content of the first user profile;
    programming causing the at least one processor to automatically select a content source for the multimedia content selected by the first user, the content source being one of a plurality of content sources through which the multimedia content is accessible; the automatically selecting being at least partially executed by the at least one processor comparing the selected hierarchy of content source attributes of the first user profile to actual content source attributes associated with the plurality of content sources;
    programming causing the at least one processor to actuate the output device and thereby display the multimedia content selected by the first user from the automatically-selected content source for that multimedia content;
    programming allowing the second user to select multimedia content from a plurality of multimedia content meeting the personal settings relating to filtering content of the second user profile;
    programming causing the at least one processor to automatically select a content source for the multimedia content selected by the second user, the content source being one of a plurality of content sources through which the multimedia content is accessible; the automatically selecting being at least partially executed by the at least one processor comparing the selected hierarchy of content source attributes of the second user profile to actual content source attributes associated with the plurality of content sources;
    programming causing the at least one processor to actuate the output device and thereby display the multimedia content selected by the second user from the automatically-selected content source for that multimedia content.

2. The system of claim 1, wherein:
    the selected hierarchy of content source attributes of the first user profile is a selected hierarchy of cost attributes and output quality attributes; and the selected hierarchy of content source attributes of the second user profile is a selected hierarchy of cost attributes and output quality attributes.

3. The system of claim 1, wherein:

the first user profile includes a first budget;

the second user profile includes a second budget different from the first budget;

the at least one non-transitory computer memory further stores a past expenditure amount associated with the first user profile and a separate past expenditure amount associated with the second user profile;

the automatic selection of a content source for the multimedia content selected by the first user is restricted to content sources which do not cause the first budget to be exceeded by adding the past expenditure amount associated with the first user profile and any cost from a respective content source for the user-selected multimedia content; and the automatic selection of a content source for the multimedia content selected by the second user is restricted to content sources which do not cause the second budget to be exceeded by adding the past expenditure amount associated with the second user profile and any cost from a respective content source for the user-selected multimedia content.

4. The system of claim 3, wherein:

the selected hierarchy of content source attributes of the first user profile is a selected hierarchy of cost attributes and output quality attributes;

the selected hierarchy of content source attributes of the second user profile is a selected hierarchy of cost attributes and output quality attributes;

when the selected hierarchy of content source attributes of the first user profile is insufficient to fully distinguish the multiple content sources, the automatic selection is further based on at least one of:

(a) transmission performance; and (b) a preferential relationship with a respective content source; and when the selected hierarchy of content source attributes of the first second user profile is insufficient to fully distinguish the multiple content sources, the automatic selection is further based on at least one of:

(c) transmission performance; and (d) a preferential relationship with a respective content source.

5. The system of claim 3, wherein:

the selected hierarchy of content source attributes of the first user profile is a selected hierarchy of cost attributes and output quality attributes; and when the selected hierarchy of content source attributes of the first user profile is insufficient to fully distinguish the multiple content sources, the automatic selection is further based on at least one of:

(a) transmission performance; and (b) a preferential relationship with a respective content source.

6. The system of claim 1, wherein the selected hierarchy of content source attributes of the first user profile is a selected hierarchy of cost attributes and output quality attributes.

7. The system of claim 1, wherein:

the first user profile includes a first budget;

the at least one non-transitory computer memory further stores a past expenditure amount associated with the first user profile;

the automatic selection of a content source for the multimedia content selected by the first user is restricted to content sources which do not cause the first budget to be exceeded by adding the past expenditure amount associated with the first user profile and any cost from a respective content source for the user-selected multimedia content.

8. The system of claim 1, wherein:

the selected hierarchy of content source attributes of the first user profile is a selected hierarchy of cost attributes and output quality attributes;

the selected hierarchy of content source attributes of the second user profile is a selected hierarchy of cost attributes and output quality attributes;

when the selected hierarchy of content source attributes of the first user profile is insufficient to fully distinguish the multiple content sources, the automatic selection is further based on at least one of:

(a) transmission performance; and (b) a preferential relationship with a respective content source; and when the selected hierarchy of content source attributes of the second user profile is insufficient to fully distinguish the multiple content sources, the automatic selection is further based on at least one of:

(c) transmission performance; and (d) a preferential relationship with a respective content source.

9. The system of claim 1, wherein:

the selected hierarchy of content source attributes of the first user profile is a selected hierarchy of cost attributes and output quality attributes; and when the selected hierarchy of content source attributes of the first user profile is insufficient to fully distinguish the multiple content sources, the automatic selection is further based on at least one of:

(a) transmission performance; and (b) a preferential relationship with a respective content source.

10. The system of claim 1, wherein:

the first user profile includes a first budget; and the second user profile includes a second budget different from the first budget.

\* \* \* \* \*

UNITED STATES PATENT AND TRADEMARK OFFICE
CERTIFICATE OF CORRECTION

PATENT NO. : 9,098,510 B2  
APPLICATION NO. : 13/554660  
DATED : August 4, 2015  
INVENTOR(S) : Seryakov et al.

Page 1 of 1

It is certified that error appears in the above-identified patent and that said Letters Patent is hereby corrected as shown below:

In the claims
Col. 17, line 41, claim 4, delete the word "first".

Signed and Sealed this
Twelfth Day of April, 2016

Michelle K. Lee
*Director of the United States Patent and Trademark Office*